US011886345B2

(12) United States Patent
Steinmacher-Burow

(10) Patent No.: US 11,886,345 B2
(45) Date of Patent: *Jan. 30, 2024

(54) SERVER RECOVERY FROM A CHANGE IN STORAGE CONTROL CHIP

(71) Applicant: INTERNATIONAL BUSINESS MACHINES CORPORATION

(72) Inventor: Burkhard Steinmacher-Burow, Esslingen am Neckar (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/820,092

(22) Filed: Aug. 16, 2022

(65) Prior Publication Data

US 2022/0391322 A1 Dec. 8, 2022

Related U.S. Application Data

(63) Continuation of application No. 17/080,324, filed on Oct. 26, 2020, now Pat. No. 11,449,424.

(51) Int. Cl.
| | |
|---|---|
| *G06F 12/0817* | (2016.01) |
| *G06F 12/02* | (2006.01) |
| *G06F 11/20* | (2006.01) |
| *G06F 12/0808* | (2016.01) |

(52) U.S. Cl.
CPC ...... *G06F 12/0817* (2013.01); *G06F 11/2033* (2013.01); *G06F 12/0284* (2013.01); *G06F 12/0292* (2013.01); *G06F 12/0808* (2013.01)

(58) Field of Classification Search
CPC .. G06F 12/0817; G06F 12/0284; G06F 12/02; G06F 12/0292; G06F 12/0808; G06F 11/2033; G06F 12/08
See application file for complete search history.

(56) References Cited

U.S. PATENT DOCUMENTS

| | | | |
|---|---|---|---|
| 6,836,815 B1 | 12/2004 | Purcell | |
| 7,162,587 B2 | 1/2007 | Hiken | |
| 7,995,499 B2 | 8/2011 | Sharma | |
| 8,738,860 B1* | 5/2014 | Griffin | ............... G06F 12/0897 711/122 |

(Continued)

OTHER PUBLICATIONS

R. E. Matick, "Functional cache chip for improved system performance," in IBM Journal of Research and Development, vol. 33, No. 1, pp. 15-32, Jan. 1989.*

(Continued)

*Primary Examiner* — Pierre Michel Bataille
(74) *Attorney, Agent, or Firm* — Nathan M. Rau

(57) ABSTRACT

Configuring an address-to-SC unit (A2SU) of each of a plurality of CPU chips based on a number of valid SC chips in the computer system is disclosed. The A2SU is configured to correlate each of a plurality of memory addresses with a respective one of the valid SC chips. In response to detecting a change in the number of valid SC chips, pausing operation of the computer system including operation of a cache of each of the plurality of CPU chips; while operation of the computer system is paused, reconfiguring the A2SU in each of the plurality of CPU chips based on the change in the number of valid SC chips; and in response to reconfiguring the A2SU, resuming operation of the computer system.

20 Claims, 6 Drawing Sheets

(56) References Cited

U.S. PATENT DOCUMENTS

| | | | |
|---|---|---|---|
| 9,513,685 | B2 | 12/2016 | Murakami |
| 10,114,772 | B1 | 10/2018 | Steinmacher-Burow |
| 10,521,357 | B1* | 12/2019 | Ramey ............... G06F 12/1027 |
| 11,316,713 | B2 | 4/2022 | Steinmacher-Burow |
| 2014/0325260 | A1 | 10/2014 | Gladwin |
| 2015/0205733 | A1 | 7/2015 | Steinmacher-Burow |
| 2016/0147661 | A1 | 5/2016 | Ambroladze |
| 2016/0205244 | A1* | 7/2016 | Dvortsov ............. H04M 19/04 455/414.1 |
| 2017/0060637 | A1* | 3/2017 | Persson ................. G06F 21/55 |
| 2018/0166130 | A1* | 6/2018 | Intrater .............. G11C 16/3459 |
| 2018/0367371 | A1 | 12/2018 | Nagarajan |
| 2019/0020568 | A1 | 1/2019 | Kommula |
| 2020/0106664 | A1 | 4/2020 | Kapur |
| 2020/0151124 | A1 | 5/2020 | Thomas |
| 2022/0129384 | A1 | 4/2022 | Steinmacher-Burow |

OTHER PUBLICATIONS

G. Zorpette, "Computers that are 'never' down [fault-tolerant computers]," in IEEE Spectrum, vol. 22, No. 4, pp. 46-54, Apr. 1985.*
M. D. Marino and K.-C. Li, "RAMON: Region-Aware Memory Controller," in IEEE Transactions on Very Large Scale Integration (VLSI) Systems, vol. 26, No. 4, pp. 697-710, Apr. 2018.*
Satyanarayanan, "Special Feature: Commercial Multiprocessing Systems," in Computer, vol. 13, No. 5, pp. 75-96, May 1980.*
"Arista 7500R Switch Architecture ('A day in the life of a packet')," Arista, printed Aug. 27, 2019, 20 pages. <https://www.arista.com/assets/data/pdf/Whitepapers/Arista7500RSwitchArchitectureWP.pdf>.
"Cache (computing)," Wikipedia, accessed Jan. 9, 2020, 6 pages. <https://en.wikipedia.org/wiki/Cache_(computing)>.
"Cisco Network Convergence System NCS 5500 Modular Platform Architecture," Cisco, printed Aug. 27, 2019, 17 pages. <https://www.cisco.com/c/dam/en/us/products/collateral/routers/network-convergence-system-5500-series/ncs5500-modular-platform-architecture-white-paper.pdf>.
"Direct Plug Orthogonal Backplane Solutions Provide Best In Class Electrical Performance and Density," TE Connectivity, Apr. 4, 2016, 2 pages. <https://www.te.com/usa-en/about-te/news-center/strada-whisper-direct-plug-orthogonal-dpo-connectors.html>.
"Directory-based cache coherence" Wikipedia, accessed Jan. 9, 2020, 2 pages. <https://en.wikipedia.org/wiki/Directory-based_cache_coherence>.
"Directory-based coherence" Wikipedia, accessed Jan. 9, 2020, 2 pages. <https://en.wikipedia.org/wiki/Directory-based_coherence>.
"Division of Labour," Wikipedia, printed Aug. 27, 2019, 13 pages. <https://en.wikipedia.org/wiki/Division_of_labour>.
"ExaMAX® 56Gb/s High Speed Orthogonal Connector System," Amphenol Information Communications and Commercial Products, accessed Nov. 25, 2019, 6 pages. <https://www.amphenol-icc.com/media/wysiwyg/files/documentation/datasheet/backplane/bpl_examax_orthogonal.pdf>.
"Impulse Direct Backplane Connector System and Cable Assemblies," Molex, printed Aug. 27, 2019, 2 pages. <www.literature.molex.com/SQLImages/kelmscott/Molex/PDF_Images/987651-6082.PDF>.
"Intelligent Platform Management Interface," Wikipedia, printed Aug. 27, 2019, 5 pages. <https://en.wikipedia.org/wiki/Intelligent_Platform_Management_Interface>.
"MESI Protocol," Wikipedia, accessed Jan. 9, 2020, 6 pages. <https://en.wikipedia.org/wiki/MESI_protocol>.
"Nvidia tesla v100-AWS," Image on p. 35, printed Aug. 27, 2019, 1 page. <cms.ipressroom.com.s3.amazonaws.com/219/files/20182/JHH_GTC2018_FINAL2.pdf>.
"NVIDIA Tesla V100 GPU Archtecture," NVIDIA.com, Aug. 2017, 58 pages. <images.nvidia.com/content/volta-architecture/pdf/volta-architecture-whitepaper.pdf>.

"Out-of-band management," Wikipedia, printed Aug. 27, 2019, 2 pages. <https://en.wikipedia.org/wiki/Out-of-band_management>.
"SAP Standard Application Benchmarks," SAP.com, printed Aug. 27, 2019, 3 pages. <https://www.sap.com/about/benchmark.html>.
Andreyev, "Introducing data center fabric, the next-generation Facebook data center network," Facebook Engineering, Nov. 14, 2014, 7 pages. <https://engineering.fb.com/production-engineering/introducing-data-center-fabric-the-next-generation-facebook-data-center-network/>.
Babcock, "IBM DB2's 25th Anniversary: Birth Of An Accidental Empire," InformationWeek.com, Jun. 9, 2008, 2 pages. <https://www.informationweek.com/ibm-db2s-25th-anniversary-birth-of-an-accidental-empire/d/d-id/1068685>.
Berry et al., "IBM z14™: 14nm microprocessor for the next-generation mainframe," 2018 IEEE International Solid-State Circuits Conference—(ISSCC), Mar. 12, 2018, 3 pages. <https://Ieeexplore.ieee.org/document/8310171>.
Busaba et al., "IBM zEnterprise 196 microprocessor and cache subsystem," IBM Journal of Research and Development, vol. 56, Issue 1.2, Paper 1, Jan./Mar. 2012, p. 1:1-1:12. <https://ieeexplore.ieee.org/abstract/document/6136232>.
Codd, "A Relational Model of Data for Large Shared Data Banks," Communications of the ACM, vol. 16, Issue 6, Jun. 1970, pp. 377-387. <https://dl.acm.org/citation.cfm?id=362685>.
Dashti et al., "Traffic Management: A Holistic Approach to Memory Placement on NUMA Systems," Proceedings of the eighteenth international conference on Architectural support for programming languages and operating systems, vol. 48, Apr. 2013, 13 pages. <https://dl.acm.org/citation.cfm?id=2451157>.
Deierling, "In Modern Datacenters, The Latency Tail Wags The Network Dog," The Next Platform, Mar. 27, 2018, 10 pages. <https://www.nextplatform.com/2018/03/27/in-modern-datacenters-the-latency-tail-wags-the-network-dog/>.
Gough et al., "BIOS and Management Firmware," Energy Efficient Servers, Apr. 7, 2015, 21 pages. <https://link.springer.com/chapter/10.1007/978-1-4302-6638-9_5#citeas>.
Hanks, "Juniper QFX10000 Series," O'Reilly.com, printed Aug. 27, 2019, p. 39. <https://www.oreilly.com/library/view/juniper-qfx10000-series/9781491922248/ch01.html>.
Harris, "Inside Pascal: NVIDIA's Newest Computing Platform," NVIDIA Developer Blog, Apr. 5, 2016, 15 pages. <https://devblogs.nvidia.com/inside-pascal/>.
Ishii et al., "NVSWITCH and DGX-2 NVLINK-Switching Chip and Scale-Up Compute Server," NVIDIA, printed Aug. 29, 2019, 30 pages. <www.hotchips.org/hc30/2conf/2.01_Nvidia_NVswitch_HotChips2018_DGX2NVS_Final.pdf>.
Kim, "High Radix Interconnection Networks," Stanford University Department of Electrical Engineering and the Committee on Graduate Studies, Mar. 2008, 158 pages. <http://cva.stanford.edu/publications/2008/jkim_thesis.pdf>.
Kothe et al., "Exascale Computing Project Update," Exascale Computing Project, Dec. 20, 2017, 32 pages. <http://science.energy.gov/~/media/ascr/ascac/pdf/meetings/201712/ECP_Update_ASCAC_20171220.pdf>.
Lascu et al., "IBM z14 (3906)Technical Guide," IBM Redbooks, Oct. 2018, pp. 4, 6, 13, 125. <www.redbooks.ibm.com/redbooks/pdfs/sg248451.pdf>.
List of IBM Patents or Patent Applications Treated as Related (Signed Aug. 16, 2022) 2 pages.
Liu et al., "An Early Performance Study of Large-Scale POWER8 SMP Systems," 2016 IEEE International Parallel and Distributed Processing Symposium (IPDPS), May 23-27, 2016, # pages. <ieeexplore.ieee.org/document/7516022>.
Matson, "Intel Innovations Re-Imagining Data Center Storage and Memory," OCP Summit, Mar. 2018, 15 pages. <https://www.opencompute.org/files/NSG-OCP-2018-final-r5.pdf>.
Morgan, "Cray CTO Connects The Dots On Future Interconnects," The Next Platform, Jan. 8, 2016, 17 pages. <https://www.nextplatform.com/2016/01/08/cray-cto-connects-the-dots-on-future-interconnects/>.

(56) References Cited

OTHER PUBLICATIONS

Morgan, "More Knights Landing Xeon Phi Secrets Unveiled," The Next Platform, Mar. 25, 2015, 8 pages. <https://www.nextplatform.com/2015/03/25/more-knights-landing-xeon-phi-secrets-unveiled/>.

Morgan, "Power9 Big Iron "Fleetwood/Mack" Rumors," IT Jungle, Oct. 9, 2017, 5 pages. <https://www.itjungle.com/2017/10/09/power9-big-iron-fleetwoodmack-rumors/>.

Plattner, "The Impact of Intel's Haswell Architecture on SAP's HANA (SP10)," SAP HANA Blog, Jun. 29, 2015, 9 pages. <https://blogs.saphana.com/2015/06/29/impact-of-haswell-on-hana/>.

Russell, "HPC User Forum Presses NSCI Panelists on Plans," HPC Wire, Sep. 17, 2015, 5 pages. <https://www.hpcwire.com/2015/09/17/hpc-user-forum-presses-nsci-panelists-on-plans/>.

Schor, "ISSCC 2018: The IBM z14 Microprocessor And System Control Design," WikiChip, May 13, 2018, 5 pages. <https://fuse.wikichip.org/news/941/isscc-2018-the-ibm-z14-microprocessor-and-system-control-design/>.

Teich, "Building Bigger, Faster GPU Clusters Using NVSwitches," The Next Platform, Apr. 13, 2018, 17 pages. <https://www.nextplatform.com/2018/04/13/building-bigger-faster-gpu-clusters-using-nvswitches/>.

White et al., "IBM z13 and IBM z13s Technical Introduction," IBM Redbooks, Mar. 2016, 140 pages. <http://www.redbooks.ibm.com/redbooks/pdfs/sg248250.pdf>.

Yao et al., "Facebook—Backpack 128×100GE Modular Switch," Open Compute Project, Feb. 18, 2017, p. 155. <https://www.circleb.eu/wp-content/uploads/2017/03/Backpack_OCP_Spec_v1.10.pdf>.

\* cited by examiner

SERVER RECOVERY FROM A CHANGE IN STORAGE CONTROL CHIP

BACKGROUND

Conventional large servers are typically packaged or physically constructed by cabling together 2 or more physical drawers. A physical drawer can contain 1 or more central processing unit (CPU) chips. Typically, each CPU chip is connected to memory storage and each CPU chip has connectors, such as PCIe connectors, for expansion cards. Additionally, each CPU chip has 1 or more symmetric multiprocessing (SMP) links to other CPU chips. Each drawer is coupled to another drawer using a storage control (SC) chip. However, such conventional chip-to-chip topology connecting SC and CPU chips does not allow all CPU chips to operate after an SC chip fails.

SUMMARY

Aspects of the disclosure may include a computer-implemented method, computer program product, and system. One example of the computer-implemented method of recovering from a change in a number of storage control (SC) chips in a computer system comprises configuring an address-to-SC unit (A2SU) of each of a plurality of central processing unit (CPU) chips based on a number of valid SC chips in the computer system. Each of the plurality of CPU chips is coupled to each of the SC chips in a leaf-spine topology. The A2SU is configured to correlate each of a plurality of memory addresses with a respective one of the valid SC chips. The method further comprises, in response to detecting a change in the number of valid SC chips, pausing operation of the computer system including operation of a cache of each of the plurality of CPU chips; while operation of the computer system is paused, reconfiguring the A2SU in each of the plurality of CPU chips based on the change in the number of valid SC chips; and in response to reconfiguring the A2SU, resuming operation of the computer system.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
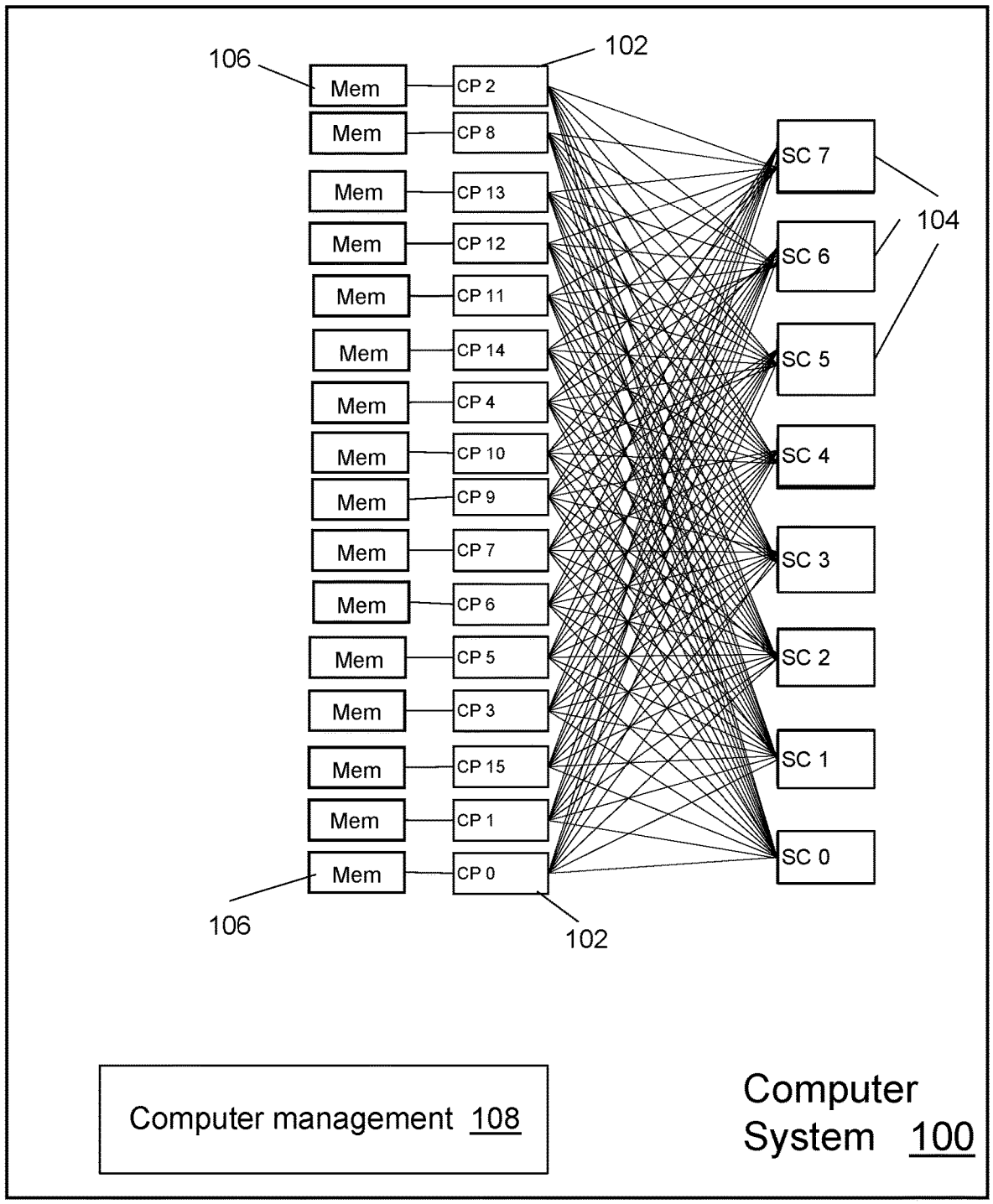
FIG. 1 is a block diagram of one embodiment of an example computer system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts one embodiment of an example computer system 100. In particular, FIG. 1 depicts one example of a leaf-spine computer system or a leaf-spine server. The system 100 leverages a leaf-spine topology in which each of a plurality of central processing unit (CPU) chips 102 (labelled CP 0 to CP 15 in this example) is communicatively coupled with each of a plurality of storage control (SC) chips 104 (labelled SC 0 to SC 7 in this example). In this way, any two or more CPU chips 102 can communicate with one another. Each CPU chip 102 can be a single-chip-module (SCM) in some embodiments, or a dual-chip-module (DCM), in other embodiments.

Furthermore, each CPU chip 102 includes local memory storage 106 attached to the respective CPU chip 102. Each memory storage 106 can be implemented using volatile memory such as random access memory (e.g., static random access memory (SRAM) or dynamic random access memory (DRAM)). In this embodiment, the memory storage 106 is implemented using DRAM (e.g. Synchronous dynamic random-access memory (SDRAM), Double Data Rate Synchronous Dynamic Random-Access Memory (DDR SDRAM), Graphics DDR SDRAM, High Bandwidth Memory (HBM), etc.). As used herein, the terms "local" and "remote" are used with respect to a given CPU chip 102. In particular, "local memory storage" refers to memory which is attached to the respective CPU chip 102. In contrast, "remote memory storage" refers to memory which is attached to another CPU chip 102. For example, the memory storage attached to CP 2 is local memory storage for CP 2 while the memory storage attached to CP 8 is local memory storage for CP 8. In contrast, the memory storage attached to CP 2 is remote memory storage for CP 8 and the memory storage attached to CP 8 is remote memory storage for CP 2.

Each CPU chip 102 is able to access lines of memory from remote memory storage 106 attached to other CPU chips 102 in addition to its own local memory storage. In particular, each CPU chip 102 is able to access the remote memory storage 106 via a respective SC chip 104. For example, each SC chip 104 can be uniquely responsible for a certain subset of addresses. Thus, if a CPU chip 102 needs to access a memory line not in its local storage memory 106, it can identify the appropriate SC chip 104 for directing a request to the CPU chip 102 whose local memory storage 106 corresponds to the requested memory line.

The computer system 100 includes a computer management module 108 configured to perform management functions for the system 100 similar to conventional computer management modules. However, unlike conventional computer management modules, the computer management module 108 in the example embodiment of FIG. 1 is also configured to perform functions to enable the system 100 to survive a failure of one or more of the SC chips 104. For example, if one of the SC chips 104 fails, then the CPU chips 102 are unable to access memory lines for which that failed SC chip is responsible. In addition, in some embodiments, the SC chips 104 are configured to perform cache coherency for data values cached by the CPU chips 102. The performance of the cache coherency is also disrupted when one of the SC chips 104 fails in such an embodiment. In response to detection of a failure of an SC chip 104, the computer management module 108 is configured to pause operation of the system 100 and direct the CPU chips 102 and/or SC chips 104 in reconfiguring the system 100 to account for the failed SC chip 104. Similarly, if it is detected that an SC chip 104 has been added to the computer system 100, the computer management module 108 can pause operation of the system and direct the CPU chips 102 and/or SC chips 104 in reconfiguring the system 100 to make use of the added SC chip 104. Further details regarding the operations performed by system 100 to reconfigure the system 100 are discussed in more detail below.

The computer management module 108 can be implemented in hardware, software, or a combination of hardware and software. For example, in some embodiments, the computer management module 108 can be implemented by software executing on one or more of CPU chips 102. In other embodiments, the computer management module 108 can be implemented as software or firmware executing on a separate processing unit. For example, in some embodiments, the computer management module 108 is implemented as firmware utilizing a baseboard management controller (BMC) of an Intelligent Platform Management Interface (IPMI) sub-system.

Figure 2:
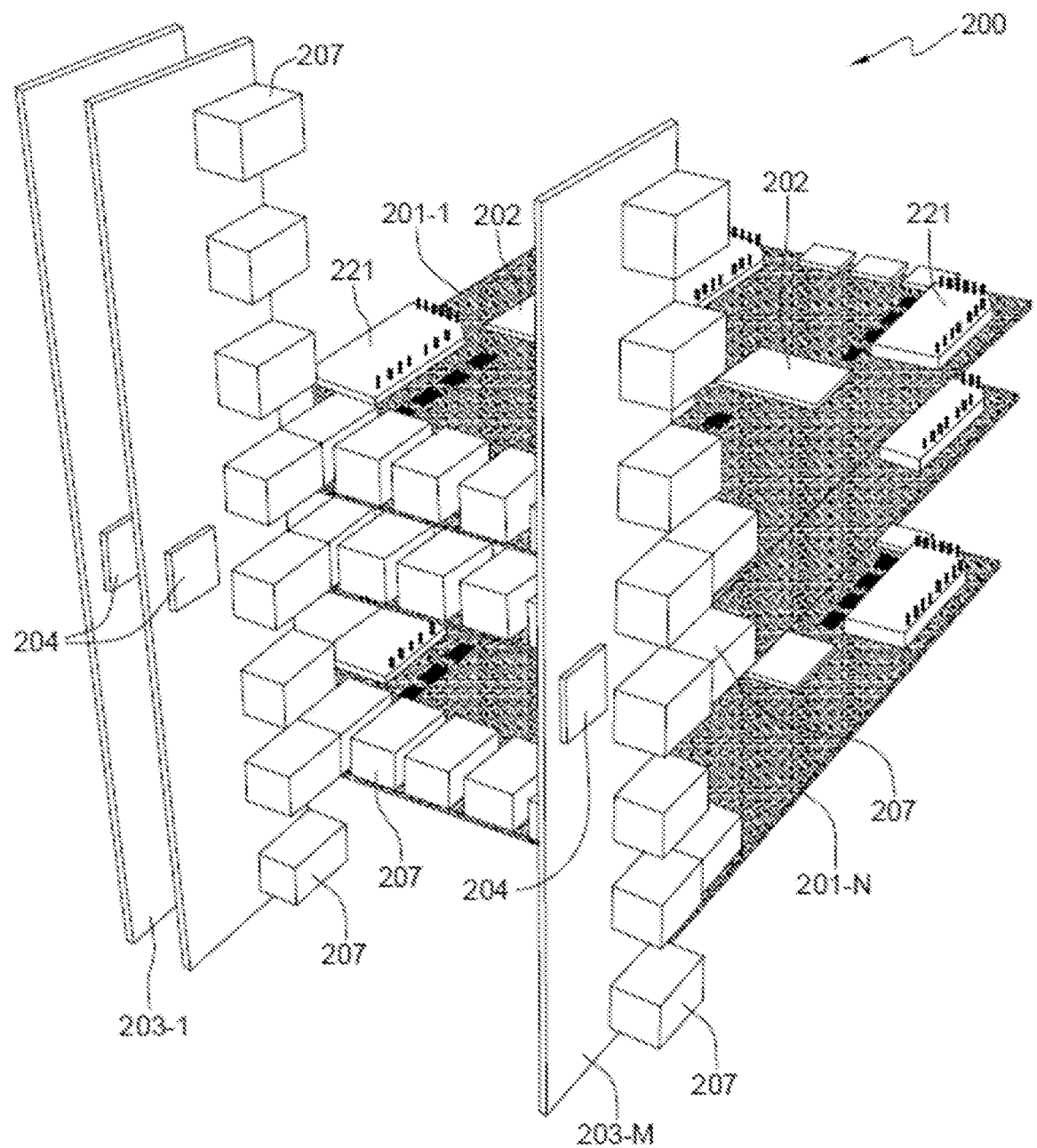
FIG. 2 is a depiction of one embodiment of an example packaging for the computer system of FIG. 1.

FIG. 2 is a depiction of one embodiment of an example packaging 200 for computer system 100. Packaging 200 includes a plurality of CPU boards 201-1 ... 201-N (collectively referred to as CPU boards 201) and a plurality of SC boards 203-1 ... 203-M (collectively referred to as SC boards 203). Although only 3 CPU boards 201 and 3 SC boards 203 are shown for ease of illustration, it is to be understood that any suitable number of CPU boards 201 and SC boards 203 can be used. Furthermore, for computer system 100, the example packaging 200 includes 8 SC boards 203 and 8 CPU boards 201. Thus, each SC board 203 includes one SC chip 204 and each CPU board 201 includes two CPU chips 202 in this example. However, it is to be understood that, in other embodiments, other configurations can be used. For example, in some embodiments, each CPU board 201 includes one CPU chip 202. In such examples, 16 CPU chips use 16 CPU boards 201. Additionally, in some embodiments, each SC board 203 can include more than 1 SC chip. For example, in some such embodiments, each SC board 203 includes 2 SC chips. In such embodiments, 4 SC boards 203 could be used for the example computer system 100 instead of the 8 SC boards in the example of FIG. 2.

Each SC board 203 and each CPU board 201 in the example of FIG. 2 also include 8 orthogonal direct connectors 207. It is to be understood that the number of orthogonal direct connectors 207 included on each CPU board 201 is at least equal to the number of SC boards 203 in the packaging 200. Similarly, the number of orthogonal direct connectors 207 mounted on each SC board 203 is at least equal to the number of CPU boards 201 in the packaging 200. The orthogonal direct connectors 207 enable the SC boards 203 and the CPU boards 203 to be connected in an orthogonal-direct topology such that each CPU chip 202 is communicatively coupled with each SC chip 204.

It is to be understood that the packaging 200 is provided by way of example and that other configurations can be used in other embodiments. For example, it is to be understood that each CPU board 201 can include components similar to conventional CPU boards (e.g. memory storage, SMP links, etc.). In some embodiments, other components can be included on the CPU boards 201 and/or the SC boards 203. For example, in this embodiment, each CPU board 201 includes memory storage 221. Additionally, in some embodiments, each SC chip 204 includes a cache, such as for storing a cache coherence directory as discussed in more detail below. In other embodiments, a separate memory on each SC board 203 can be included for storing the cache coherence directory. In addition, in some embodiments, each SC chip 204 can include a data cache for caching data requested by the CPU chips 202. However, in such embodiments, the SC chips 204 are configured to only cache redundant data. That is, the SC chips 204 are configured not to cache data or directory information for which the SC chip has the only copy of the data or directory information, as described in more detail below.

Figure 3:
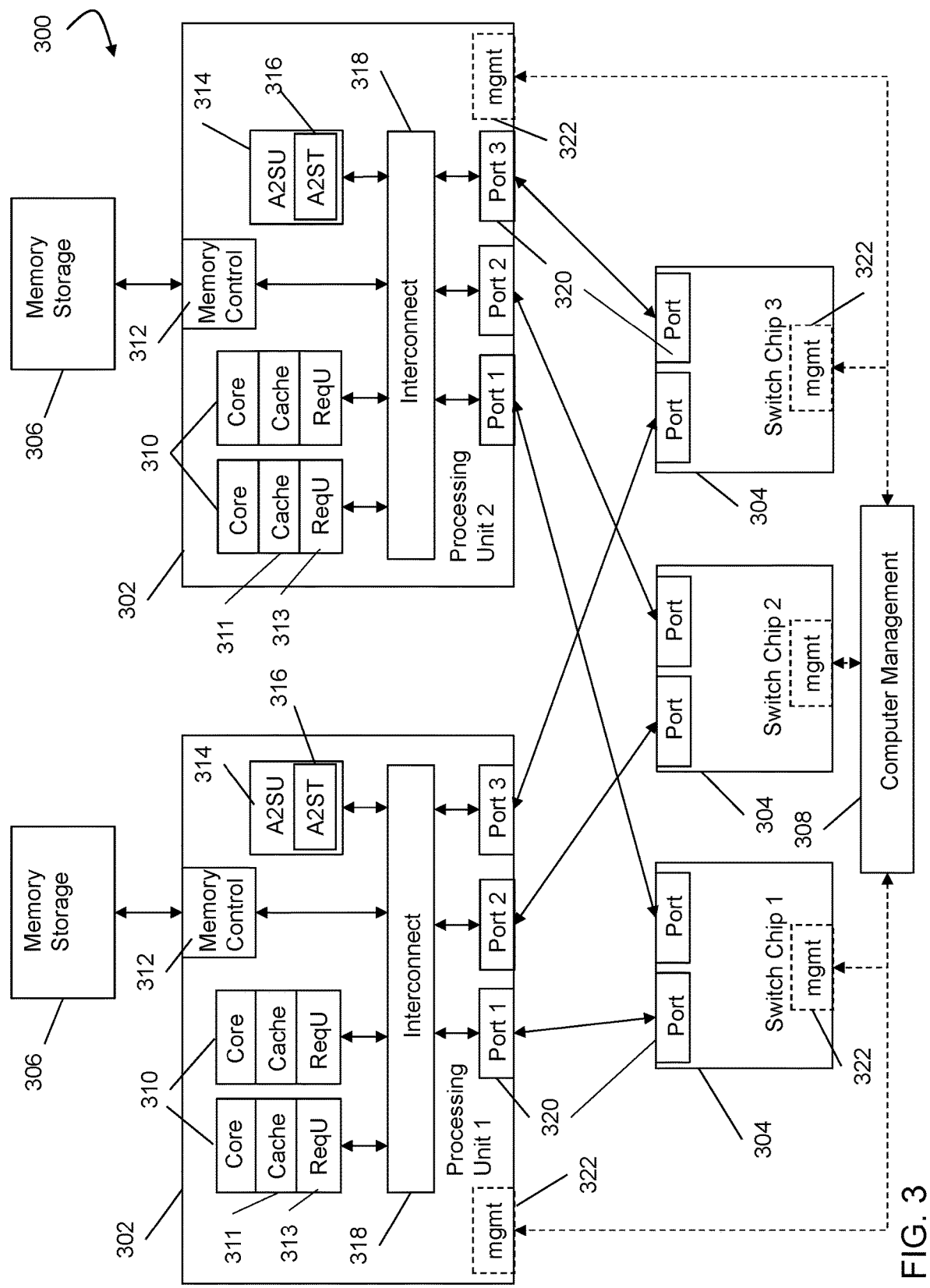
FIG. 3 is a block diagram depicting illustrative components of one embodiment of a computer system.

FIG. 3 is a block diagram depicting illustrative components of one embodiment of a computer system 300. The computer system 300 can be packaged in a fashion similar to that of FIG. 2, comprising multiple boards, each with orthogonal direct connectors. Alternatively, the computer system 300 can be packaged as a single-board computer, with all the components mounted on a single board. The computer system 300 implements a leaf-spine topology as in the computer system 100 described above. Thus, the computer system 100 can be implemented using the components discussed herein with respect to computer system 300. As with computer system 100, computer system 300 includes a plurality of CPU chips 302 and a plurality of SC chips 304. However, for purposes of illustration, only two CPU chips 302 (also referred to as processing unit 1 and processing unit 2 in FIG. 3) and only three SC chips 304 are depicted in FIG. 3. It is to be understood that more than 2 CPU chips 302 and more than 3 SC chips 304 can be utilized in other embodiments.

Each of the CPU chips 302 includes one or more processor cores 310, a memory controller 312, an Address-to-SC unit (A2SU) 314, an interconnect (e.g., BUS) 318, and a plurality of ports 320. The interconnect 318 is used to move data between the cores 310, memory controller 312, A2SU 314, and ports 320. The interconnect 318 can be implemented using one or more busses. The memory controller 312 in each CPU chip 302 is coupled to a respective memory storage 306. As discussed above, the memory storage 306 can be implemented using a random access memory chip. Each of the cores 310 includes one or more caches 311 configured to cache data retrieved from the local memory storage 306 and/or one or more remote memory storage 306.

Although each of the CPU chips 302 is depicted as including three ports 320, it is to be understood that the number of ports 320 in each CPU chip 302 can be different in other embodiments. In particular, each CPU chip 302 is configured to have one port for each SC chip 304 in the system 300. Similarly, each SC chip 304 is configured to have one port 320 for each CPU chip 302. Thus, as discussed above, the leaf-spine topology enables each CPU chip 302 to access data in the memory storage 306 attached to other CPU chips 302 via a corresponding SC chip 304.

In this embodiment, the A2SU 314 in each CPU chip 302 is configured to maintain an Address-to-SC Table (A2ST) 316. The A2ST 316 includes information correlating memory addresses with the appropriate SC chip 304. For example, the total memory of the computer system 300 can be configured with the addresses of consecutive memory blocks consecutive or interleaved over the memory storage 306 of the CPU chips 302. The A2SU 314 is configured to perform an algorithm on a requested memory address to return a value which is correlated by the A2ST 316 to one of the SC chips 304. For example, in some embodiments, A2SU 314 is configured to perform a modulo operation on the memory addresses. However, it is to be understood that other operations can be used in other embodiments. The result of the operation is then correlated with one of the ports 320 that each correspond to respective SC chip 304. For example, a simplified A2ST is depicted below in Table 1. It is to be understood that the values in Table 1 are provided for purposes of explanation only.

TABLE 1

| Address modulus number of SC chips | Port |
|---|---|
| 0 | 3 |
| 1 | 2 |
| 2 | 1 |

The A2SU 314 can be implemented via hardware circuitry in some embodiments, such as through the use of logic gates. In other embodiments, the A2SU 314 can be implemented as firmware containing instruction executed by one or more of the cores 310. When the computer system 100 is booted, the computer management 308 or the A2SU 314 in each CPU chip 302 determines the number of operational or valid SC chips 304 attached to the CPU chip 302 and configures the A2ST 316. After boot, when a core 310 of the CPU chip 302 requests access to an address not in cache 311 on the CPU chip 302, the A2SU 314 performs the modulus operation on the requested address and uses the A2ST 316 to identify the port over which the request is to be sent to the corresponding SC chip 304.

When a change in the number of valid SC chips 304 is detected (e.g. failure of one of the SC chips 304 or addition of an SC chip 304), the computer management 308 is configured to pause the operation of computer system 300. For example, the computer management 308 can send a signal to each of the CPU chips 302 and each of the SC chips 304 via respective management ports 322 to instruct each of the CPU chips 302 and SC chips 304 to pause operation. Each of the cores 310 includes a request unit (ReqU) 313. The ReqU 313 is configured to process outstanding requests from its local cache 311. That is, when the local cache 311 requests a memory line, the ReqU 313 is responsible for tracking that request until it is satisfied and the cache 311 receives the requested line. When the normal operation of the computer system 300 is paused, the ReqU 313 in each of the cores 310 is also paused. Even though it is paused, the ReqU 313 will still have a record of outstanding requests which have not been completed. Once the normal operation of the computer system 300 resumes, the ReqU 313 is configured to continue tracking and sending out requests for the outstanding or unfilled requests from the cache 311. Thus, even if the computer system 300 is paused in the middle of a transaction, the ReqU 313 is configured to maintain a record of that request until completed. The ReqU 313 is able to reinitiate and track the transaction after the normal operation resumes. Thus, transactions are not lost due to pausing the computer system 300.

In addition, while normal operation of the computer system 300 is paused, the computer management 308 can determine the new number of valid SC chips 304 in the computer system 300, in other embodiments, the A2SU 314 in each of the CPU chips 302 can determine the new number of valid SC chips 304, such as by sending a ping request over each port 320 to determine which ports 320 are coupled to valid SC chips 304. After determining the new number of valid SC chips 304, the A2SU 314 modifies the algorithm used to determine the responsible SC chips 304 (e.g. a modulus operation) based on the new number of valid SC chips 304 and replaces the A2ST 316 with a new A2ST 316 that reflects the new number of valid SC chips 304. The computer management 308 then sends a signal to each CPU chip 302 and each SC chip 304 to resume normal operation once the A2SU 314 in each CPU chip 302 has reconfigured the A2ST 316 to reflect the change in the number of valid SC chips 304.

The computer management 308 is depicted in dashed lines in FIG. 3 indicating that the computer management 308 is optional. For example, in some embodiments, the functionality of the computer management 308 is implemented via one or more of the CPU chips 302 executing firmware or software instructions. In such embodiments, a separate computer management 308 can be omitted. By automatically reconfiguring to account for a detected change in the number of valid SC chips 304, the computer system 300 is able to survive a failure of one or more of the SC chips 304.

Figure 4:
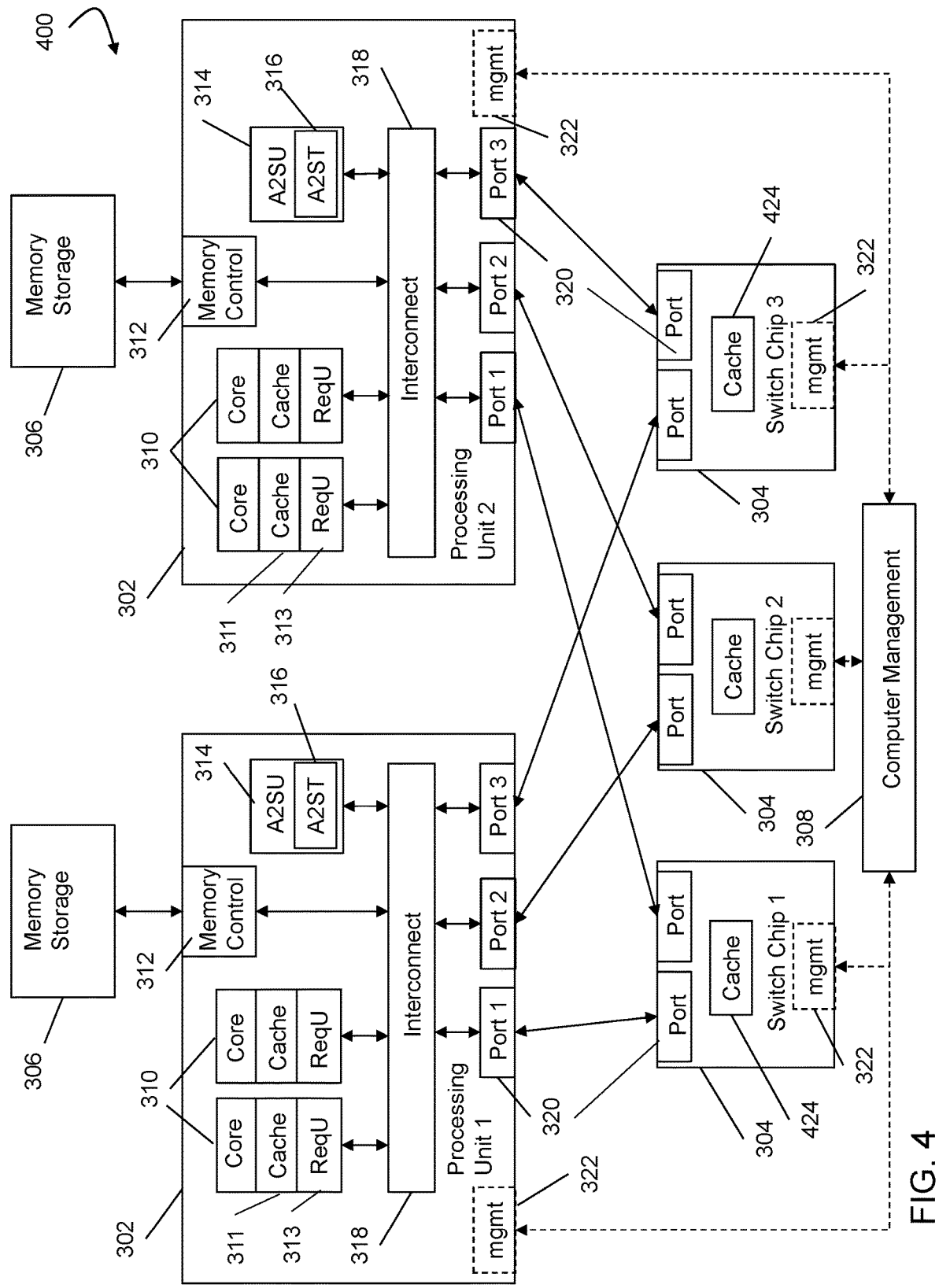
FIG. 4 is a block diagram depicting illustrative components of one embodiment of another computer system.

As discussed above, in some embodiments, each of the SC chips 304 can be configured to include a cache. FIG. 4 is a block diagram depicting illustrative components of one embodiment of another example computer system 400 in which each of the SC chips 304 includes a cache 424. The computer system 400 is similar to the computer system 300 with the addition of cache 424 in each of the SC chips 304. In some embodiments, the cache 424 is configured to store a directory for maintaining cache coherency. The cache coherence directory tracks which lines of memory are located in one or more of the caches 311 of the CPU chips 302 as well as the permissions for the line at the corresponding CPU chip 302. When a core 310 of a CPU chip 302 wants to access a memory line in a local or remote memory storage 306, the core 310 checks cache 311 to determine if the line is cached in the CPU chip 302. If the line is not cached in the CPU chip 302, it determines, using the A2SU 314, the SC chip 304 responsible for the requested line of memory and sends a request to the responsible SC chip 304. The responsible SC chip 304 uses the directory in the cache 424 to determine if the line is cached elsewhere and what the permissions are for the cached line at the corresponding CPU chip 302.

For example, assume processing unit 1 in FIG. 3 wants to access a memory line from that is not cached in the cache 311 of cores 310 in processing unit 1. Processing unit 1 then identifies SC chip 2, in this example, as the responsible SC chip for the desired memory line by using the A2SU 314, as described above. The processing unit 1 then sends a request for the memory line to SC chip 2. The SC chip 2 looks in the cache coherence directory in cache 424 to determine if any other CPU chip 302 has cached the desired memory line. If no other CPU chip 302 has cached the desired memory line, the SC chip 2 creates an entry in the directory for the desired memory line along with the access permissions assigned to the processing unit 1 for the desired memory line. If the SC chip 2 determines that another CPU chip 302, such as processing unit 2, has a copy of the desired memory line in its respective cache 311, the SC chip 2 can send a request to the processing unit 2 to release the desired memory line. Once the processing unit 2 releases the desired memory line, the SC chip 2 retrieves the desired memory line from processing unit 2 and sends the current version of the desired memory line to the processing unit 1 and updates the cache coherence directory to reflect the transaction. Operation of directory-based cache coherency is known to one of skill in the art and not discussed in more detail herein.

The SC chips 304 are configured to store only redundant data in the directory in cache 424. For example, each CPU unit 302 is configured to store information regarding the memory lines in its cache 311 and the corresponding permissions for that CPU unit 302 with respect to the cached memory lines. Each SC chip 304 stores a redundant copy of the permissions for the memory lines assigned to the given SC chip 304 that are cached in one or more of the CPU chips 302. In response to detecting a change in the number of valid SC chips 304, the computer management 308 sends a signal to pause normal operation of the computer system 400. In addition, each of the remaining SC chips 304 (e.g. non-failed SC chips 304) is configured to invalidate its cache coherence directory. Each of the CPU chips 302 is configured to reconfigure its respective A2SU 314 based on the new number of valid SC chips 304, as discussed above. In addition, for each valid line in cache 311, after reconfiguring the A2SU 314, each of the CPU chips 302 notifies the appropriate SC chip 304 to create an entry for that line with the permissions for that line. Thus, the remaining SC chips 304 are able to rebuild the cache coherence directory after the detected change in the number of valid SC chips 304. In this way, the computer system 400 is able to survive a fault and continue performing the cache coherency with the changed number of valid SC chips 304. After the cache coherency directories are rebuilt in the SC chips 304, the computer management 308 sends a signal to resume normal operation of the computer system 400.

In addition, in some embodiments, the cache 424 is a data cache configured to store cached memory lines. However, as discussed above, the SC chips 304 are not permitted to store non-redundant data in the cache 424. Hence, the SC chips 304 are configured to ensure that any lines cached in cache 424 are redundant. For example, if processing unit 1 wants to spill a memory line from its cache 311, it can write that line of cache to the corresponding SC chip 304, based on the address of the memory line. The corresponding SC chip 304 is configured not to maintain the only copy of that memory line. Hence, the corresponding SC chip 304 writes the line received from processing unit 1 to the corresponding CPU chip 302 (e.g. processing unit 2) which is attached to the original local memory storage from which the line was accessed. Once the processing unit 2 sends an acknowledgement (ACK) to the corresponding SC chip 304 that the line has been cached, the corresponding SC chip 304 can send a notice permitting the processing unit 1 to remove the memory line from its cache 311. Thus, the SC chips 304 only cache a readable copy of memory lines for which an original copy is stored on one of the CPU chips 302.

Furthermore, it is to be understood that, in other embodiments, each SC chip 304 can include both a cache coherence directory and a data cache. The SC chips 304 are configured to only store redundant data in both types of cache in the embodiments described herein, such that the system is able to recover from or survive a change in the valid number of SC chips 304.

Figure 5:
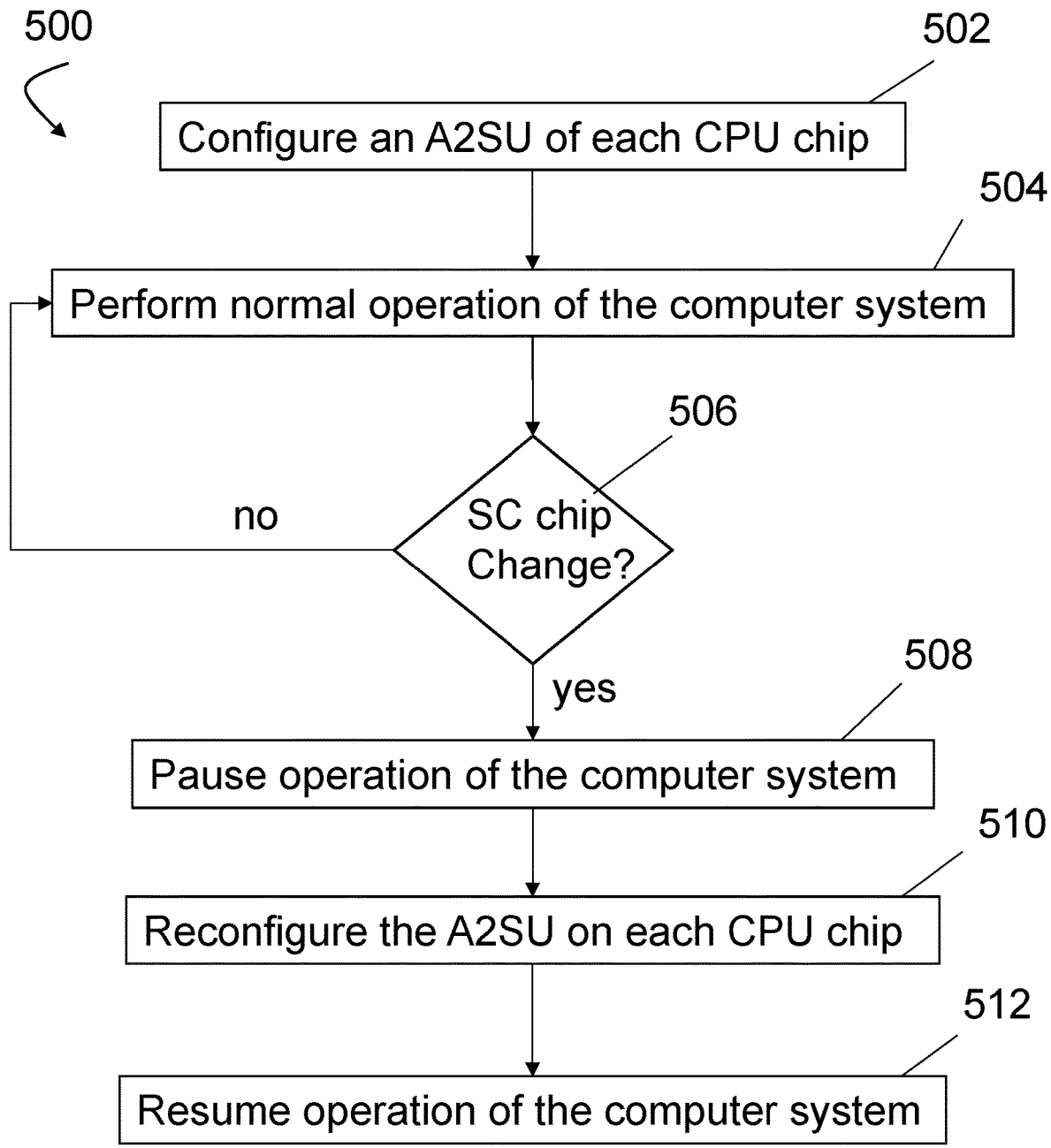
FIG. 5 is a flow chart depicting one embodiment of an example method of recovering from a change in the number of storage control chips.

FIG. 5 is a flow chart depicting one embodiment of an example method 500 of recovering from a change in the number of storage control chips. Method 500 can be implemented by a leaf-spine computer system or server, such as computer system 300. For example, in some embodiments, method 500 can be implemented by executing instructions on a CPU chip 302 or in a processor of computer management 308. It is to be understood that some actions can be omitted or additional actions can be included in other embodiments.

At 502, an address to SC chip unit (A2SU) of each CPU chip is configured based on the number of valid SC chips as discussed above. For example, the initial configuration can be performed during the boot process of the server. Additionally, in some embodiments, each CPU chip detects the number of valid SC chips. In other embodiments, a computer management device detects the number of valid SC chips and directs the CPU chips in configuring the A2SU. At block 504, the computer system performs normal operation after the boot process. As used herein, normal operation refers to the intended operation of the computer system (e.g. webserver, database server, etc.).

At block 506, the computer system determines if a change has occurred in the number of valid SC chips. The change in the number of SC chips can be the result of a detected failure of one of the SC chips. Failure of an SC chip can be detected in different ways. For example, the failure can be detected if the computer management device is unable to communicate with the SC chip. If the computer management is unable to communicate with the SC chip, the SC chip is treated as having failed. Similarly, the failure can be detected if one of the CPU chips is unable to communicate with the SC chip. This could be the result of a failed link between the CPU chip and the SC chip. Even if the other CPU chips report successful communication with the SC chip, the SC chip is still treated as a failed SC chip if one of the CPU chips reports a failed link or is otherwise unable to communicate with the SC chip. Additionally, a failure of the SC chip can be self-reported by the SC chip. For example, if the SC chip determines that it is unable to communicate with one of the CPU chips, such as due to a failed link, the SC chip is treated as a failed SC chip.

Additionally, the detected change in the number of valid SC chips can also be the result of adding an SC chip to the computer system. For example, an SC chip can be added to replace another failed SC chip or to add new functionality. In some embodiments, when a failed SC chip is replaced, the computer system is configured to keep the replacement SC chip as a spare SC chip. In other embodiments, once the failed SC chip is replaced, the computer system is reconfigured to use the replacement SC chip together with all the other SC chips. Furthermore, in some embodiments, when an SC chip is replaced, it is replaced with the same type of SC chip. In other embodiments, when a board holding the SC chip is replaced, the board is replaced with the same type of board. In yet other embodiments, when an SC board is replaced, it is replaced by a different type of SC board in order to change or add or remove features of the server.

If no change in the number of valid SC chips has been detected, then method 500 continues normal operation at 504. If a change has been detected, normal operation of the computer system is paused at 508. This includes pausing the normal use of caches in the CPU chips. At 510, the A2SU on each CPU chip is reconfigured based on the number of valid SC chips after the detected change, as discussed above. As used herein, a valid SC chip is an SC chip which is operational and configured for use by the computer system. For example, in some embodiments, the computer system includes 8 SC chips and all 8 SC chips are configured for use. In such embodiments, the number of valid SC chips is 8 prior to any detected failure or addition. In other embodiments, the computer system can be configured to use less than all of the SC chips in the computer system. For example, the computer system can be configured to keep one of the SC chips as a spare SC chip. Hence, in such embodiments, the number of valid SC chips prior to a detected failure or addition is N−1, where N is the total number of SC chips. After 510 has completed on all CPU chips, at 512, normal operation of the computer system is resumed.

Figure 6:
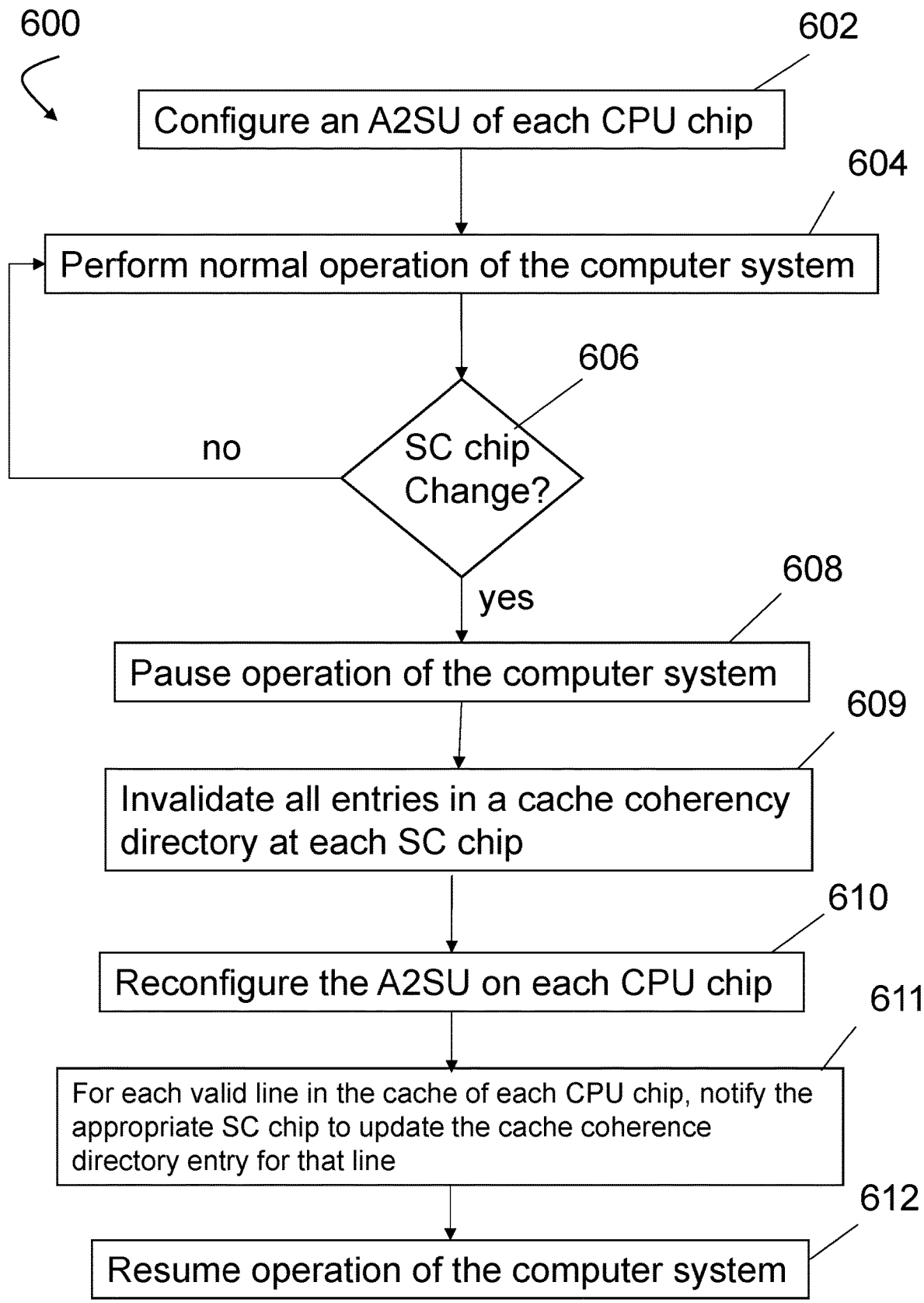
FIG. 6 is a flow chart depicting one embodiment of another example method of recovering from a change in the number of storage control chips.

FIG. 6 is a flow chart depicting one embodiment of another example method 600 of recovering from a change in the number of storage control chips. Method 600 can be implemented by a leaf-spine computer system or server, such as computer system 400, which includes one or more caches in the SC chips. For example, in some embodiments, method 600 can be implemented by executing instructions on a CPU chip 302 or in a processor of computer management 308. It is to be understood that some actions can be omitted or additional actions can be included in other embodiments.

At 602, an address to SC chip unit (A2SU) of each CPU chip is configured based on the number of valid SC chips as discussed above. For example, the initial configuration can be performed during the boot process of the server. Additionally, in some embodiments, each CPU chip detects the number of valid SC chips. In other embodiments, a computer management device detects the number of valid SC chips and directs the CPU chips in configuring the A2SU. At block 604, the computer system performs normal operation after the boot process. As used herein, normal operation refers to the intended operation of the computer system (e.g. webserver, database server, etc.).

At block 606, the computer system determines if a change has occurred in the number of valid SC chips. The change in the number of SC chips can be the result of a detected failure of one of the SC chips. Failure of an SC chip can be detected in different ways. For example, the failure can be detected if the computer management device is unable to communicate with the SC chip. If the computer management is unable to communicate with the SC chip, the SC chip is treated as having failed. Similarly, the failure can be detected if one of the CPU chips is unable to communicate with the SC chip. This could be the result of a failed link between the CPU chip and the SC chip. Even if the other CPU chips report successful communication with the SC chip, the SC chip is still treated as a failed SC chip if one of the CPU chips reports a failed link or is otherwise unable to communicate with the SC chip. Additionally, a failure of the SC chip can be self-reported by the SC chip. For example, if the SC chip determines that it is unable to communicate with one of the CPU chips, such as due to a failed link, the SC chip is treated as a failed SC chip.

Additionally, the detected change in the number of valid SC chips can also be the result of adding an SC chip to the computer system. For example, an SC chip can be added to replace another failed SC chip or to add new functionality. If no change has been detected, then method 600 continues normal operation at 604. If a change has been detected, normal operation of the computer system is paused at 608. This includes pausing the normal use of caches in the CPU chips. At 609, all entries in a cache coherence directory are invalidated at each SC chip that has not failed or been added. Invalidating the cache coherence directory can be implemented by deleting the cache coherence directory and/or entries in the cache coherence directory at each SC chip that has not failed or been added. In addition, in embodiments in which each SC chip has a data cache, all entries in the data cache in each valid SC chip are also invalidated, such as by deleting the entries.

At 610, the A2SU on each CPU chip is reconfigured based on the number of valid SC chips after the detected change, as discussed above. As used herein, a valid SC chip is an SC chip which is operational and configured for use by the computer system. For example, in some embodiments, the computer system includes 8 SC chips and all 8 SC chips are configured for use. In such embodiments, the number of valid SC chips is 8 prior to any detected failure or addition. In other embodiments, the computer system can be configured to use less than all of the SC chips in the computer system. For example, the computer system can be configured to keep one of the SC chips as a spare SC chip. Hence, in such embodiments, the number of valid SC chips prior to a detected failure or addition is N−1, where N is the total number of SC chips.

At 611, on each CPU chip, for each valid line in the cache of the CPU chip, the CPU chip notifies the appropriate SC chip, based on the reconfigured A2SU, to create or update the cache coherence directory entry for that line. In particular, the A2SU utilizes an updated A2ST to identify the appropriate SC chip, as discussed above. The information sent by the CPU chip to each of the SC chips to repopulate the cache coherence directory includes, in some embodiments, the address of the memory line and the state of the line in the CPU chip cache. In some embodiments, a Modified Exclusive Shared Invalid (MESI) protocol is used to represent and communicate the state of the cache line.

In some embodiments, the CPU chip and the SC chip are also configured to identify whether or not the invalidation of previous values in a cache line has been propagated to all the other CPU chips. Each line in the CPU chip cache is, thus, effectively marked as propagated or unpropagated. The CPU chip also sends to the appropriate SC chip, in some such embodiments, the address of each unpropagated line in the CPU chip.

In addition, during the process of notifying the appropriate SC chip, contention for an SC chip directory entry by multiple CPU chip cache lines may cause the CPU cache to flush a line. For example, an entry for a line may be directed to a particular set in the cache coherence directory. However, in embodiments where the number of SC chips is being reduced, it is possible that the intended set is already full and unable to include additional information. In such situations, for example, the SC chip can be configured to send a command to the corresponding CPU chip to flush that line if it was just a read copy. After updating the cache coherence directory as discussed, the contents of the combined SC chip cache coherence directory on all the valid SC chips represents all current cached entries on all CPU chips. After updating the cache coherence directory as discussed, the outstanding memory access requests previously issued by the CPU chips can be re-issued before normal operation is resumed. Alternatively, the outstanding memory access requests can be re-issued after normal operation has resumed. At 612, the normal operation of the computer system is resumed.

Through the embodiments discussed herein, various advantages are enabled for a computer system implementing a leaf-spine topology. For example, the computer system is able to automatically reconfigure itself to use just the remaining valid SC chips after detection of a failed SC chip. In particular, in embodiments utilizing cache coherency in the SC chips, the computer system is able to ignore any previous directory contents in the SC chips. The CPU chips are then configured to provide each SC chip with its new directory contents. Thus, the server or computer system can run using all the SC chip, and if an SC chip failure is detected, the computer system is able to continue running with the reduced number of SC chips. In addition, through the embodiments described herein, the computer system is enabled to survive an SC failure without advanced warning, such as is provided in a gradual fail. Thus, through the embodiments described herein, a computer system or server is able to achieve a higher level of Reliability and Availability and Serviceability (RAS) than without the techniques described herein.

In addition, it is to be understood that embodiments described herein and depicted in the figures are provided by way of example only and that, in other embodiments, modifications to the embodiments described herein can be performed. For example, as discussed above, in some embodiments, the SC chips implement a cache coherence directory. In some such embodiments, the SC chips only serve communication related to the memory and its coherence. In other embodiments, the SC chips do not implement a cache coherence directory, but rather implement a data cache for values of a memory line. However, in such embodiments, the SC chips do not store non-redundant copies of the data. In addition, in some embodiments, links and switching provided by the SC chips also serve other communication from one CPU chip to another. For example, this could be the communication of "Transport Layer Packets (TLPs)" for PCIe access from one CP chip to another. As with other cached data in the SC chips, the SC chips in such embodiments are configured to never hold a sole unique copy of such communication. Furthermore, although the embodiments are described with respect to central processing unit chips, it is to be understood that the embodiments described herein are also applicable to a computer system utilizing graphic processing units (GPU) chips in addition to or in lieu of CPU chips.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method of recovering from a change in a number of storage control (SC) chips in a computer system, the method comprising:
   configuring an address to SC chip unit (A2SU) of each of a plurality of central processing unit (CPU) chips based on a number of valid SC chips in the computer system;
   in response to detecting a change in the number of valid SC chips, pausing operation of the computer system including operation of a cache of each of the plurality of CPU chips;
   while operation of the computer system is paused, reconfiguring the A2SU in each of the plurality of CPU chips based on the change in the number of valid SC chips; and
   in response to reconfiguring the A2SU, resuming operation of the computer system.

2. The method of claim 1, further comprising:
   in response to detecting a change in the number of valid SC chips, invalidating all entries in a cache coherence directory in each valid SC chip; and
   in response to reconfiguring the A2SU, for each valid line in the cache of each of the plurality of CPU chips, notifying a corresponding SC chip, based on the reconfigured A2SU, to update a cache coherence directory entry for the valid line.

3. The method of claim 2, further comprising:
   in response to updating the cache coherence directory entry for each valid line in the cache of each of the plurality of CPU chips, notifying the corresponding SC chip of outstanding memory access requests previously issued by each of the plurality of CPU chips and not yet satisfied by the corresponding SC chip.

4. The method of claim 3, wherein detecting the failure of one of the valid SC chips comprises detecting a failed link between one of the plurality of CPU chips and the failed SC chip.

5. The method of claim 1, wherein detecting a change in the number of valid SC chips includes detecting a failure of one of the valid SC chips.

6. The method of claim 1, wherein detecting a change in the number of valid SC chips includes detecting addition of a new valid SC chip.

7. The method of claim 1, further comprising:
   preventing each of the valid SC chips from storing non-redundant copies of data in a respective data cache for values of a memory line; and
   in response to detecting the change in the number of valid SC chips, invalidating all entries in the respective data cache in each valid SC chip.

8. The method of claim 1, wherein each of the SC chips includes a data cache for values of a memory line;
   wherein each of the SC chips are configured to only cache redundant copies of data stored in a cache of one of the CPU chips; and
   wherein, in response to detecting the change in the number of valid SC chips, each valid SC chip is configured to invalidate all entries in the respective data cache in each valid SC chip.

9. A computer system comprising:
   a plurality of central processing unit (CPU) boards, each CPU board including one or more physical CPU chips;
   a plurality of storage control (SC) boards, each SC board including at least one SC chip; and
   wherein each of the CPU chips includes a respective address to SC chip unit (A2SU) configured to correlate each of a plurality of memory addresses with a respective one of the SC chips on the plurality of SC boards;
   wherein, in response to detecting a change in the number of SC chips, operation of the computer system is paused including operation of a cache of each of the plurality of CPU chips;
   wherein each of the CPU chips is configured to reconfigure the respective A2SU based on the change in the number of SC chips while operation of the computer system is paused; and
   wherein operation of the computer system is resumed in response to reconfiguring the A2SU in each of the plurality of CPU chips.

10. The computer system of claim 9, wherein each of the SC chips is configured to invalidate all entries in a respective cache coherence directory in response to the detected change in the number of SC chips; and
   in response to reconfiguring the A2SU, for each valid line in a cache of each of the CPU chips, each CPU chip is configured to notify a corresponding SC chip, based on the reconfigured A2SU, to update a cache coherence directory entry for the valid line.

11. The computer system of claim 10, wherein, in response to updating the cache coherence directory entry for each valid line in the cache of each of the plurality of CPU chips, each CPU chip is further configured to notify the corresponding SC chip of outstanding memory access requests previously issued by the CPU chip and not yet satisfied by the corresponding SC chip.

12. The computer system of claim 9, wherein the detection of a change in the number of SC chips includes detecting a failure of one of the SC chips.

13. The computer system of claim 12, wherein the failure of one of the SC chips is detected by one of the SC chips or one of the CPU chips detecting a failed link between one of the CPU chips and the failed SC chip.

14. The computer system of claim 9, wherein the detection of a change in the number of SC chips includes detecting addition of a new SC chip.

15. A computer program product comprising a computer readable storage medium having a computer readable program stored therein, wherein the computer readable program, when executed by a processor on a first vehicle, causes the processor to:
   configure an address to storage control (SC) chip unit (A2SU) of each of a plurality of central processing unit (CPU) chips based on a number of valid SC chips in a computer system;
   in response to detecting a change in the number of valid SC chips, pause operation of the computer system including operation of a cache of each of the plurality of CPU chips;
   while operation of the computer system is paused, reconfigure the A2SU in each of the plurality of CPU chips based on the change in the number of valid SC chips; and
   in response to reconfiguring the A2SU, resume operation of the computer system.

16. The computer program product of claim 15, wherein the computer readable program is further configured to cause the processor to:
   in response to detecting a change in the number of valid SC chips, invalidate all entries in a cache coherence directory in each valid SC chip; and
   in response to reconfiguring the A2SU, for each valid line in the cache of each of the plurality of CPU chips, notify a corresponding SC chip, based on the reconfigured A2SU, to update a cache coherence directory entry for the valid line.

17. The computer program product of claim 16, wherein the computer readable program is further configured to cause the processor to:
   in response to updating the cache coherence directory entry for each valid line in the cache of each of the plurality of CPU chips, notify the corresponding SC chip of outstanding memory access requests previously issued by each of the plurality of CPU chips and not yet satisfied by the corresponding SC chip.

18. The computer program product of claim 17, wherein the computer readable program is further configured to cause the processor to:
   prevent each of the valid SC chips from storing non-redundant copies of data in a respective data cache for values of a memory line; and
   in response to detecting the change in the number of valid SC chips, invalidate all entries in the respective data cache in each valid SC chip.

19. The computer program product of claim 15, wherein the computer readable program is further configured to cause the processor to detect a change in the number of valid SC chips by detecting a failure of one of the valid SC chips.

20. The computer program product of claim 15, wherein the computer readable program is further configured to cause the processor to detect a change in the number of valid SC chips by detecting addition of a new valid SC chip.

* * * * *